Patented Mar. 14, 1939

2,150,190

UNITED STATES PATENT OFFICE 2,150,190

SUBSTITUTED BENZANILIDES AND THE PROCESS FOR THEIR PREPARATION

Swanie Siguard Rossander and Herman Wischman Mathieu, Wilmington, Del., assignors to E. I. du Pont de Nemours & Company, Wilmington, Del., a corporation of Delaware No Drawing. Application June 29, 1937, Serial No. 150,936

11 Claims. (Cl. 260—558)

This invention relates to novel organic compounds which are useful as intermediates for the manufacture of azo dyes.

More particularly, this invention deals with novel intermediates of the general formula

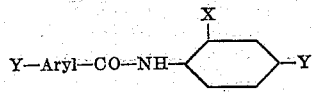

wherein X stands for either alkyl or alkoxy, while Y, Y represent nitro groups or amino groups. Aryl in the above formula, stands for a bivalent aryl radical of the benzene or naphthalene series.

We have found that compounds of the above general formula in which Y stands for $NH_2$ constitute valuable intermediates for the manufacture of azo dyes. Moreover, when tetrazotized and coupled to the usual coupling compounds in a manner similar to other diamino compounds, they give desirable shades of color of unexpected brightness and neat discharging qualities. In addition to these surprising qualities they possess good fastness properties and other desirable characteristics. These valuable characteristics are particularly true of the following members of the above general group

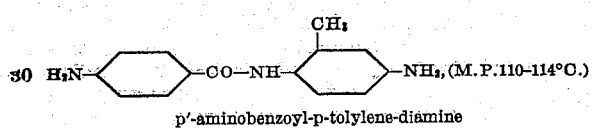

p'-aminobenzoyl-p-tolylene-diamine

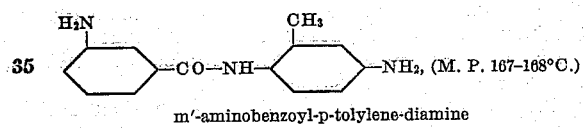

m'-aminobenzoyl-p-tolylene-diamine

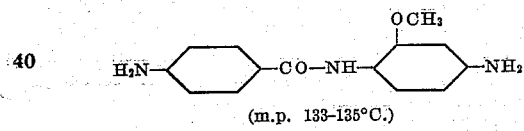

(m.p. 133-135°C.)
2(p'-aminobenzoyl) amino-5-amino-anisole

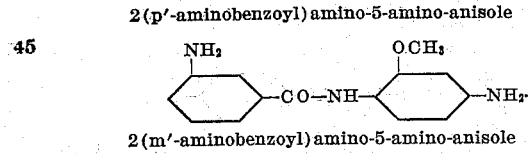

2(m'-aminobenzoyl) amino-5-amino-anisole

The compounds of the above general formula in which Y is nitro serve as intermediates for the manufacture of said amino compounds by reduction.

Our preferred method of preparing the nitro bodies consists of condensing a nitroaroyl halide of the general formula $$O_2N\text{—Aryl—CO—Z}$$

wherein Z stands for a halogen atom, while Aryl has the same significance as above, with a paranitro-aniline body of the general formula

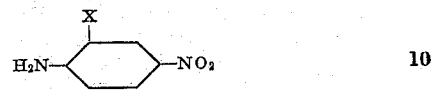

wherein X stands for alkyl or alkoxy.

Our preferred method of preparing the amino body is by reducing the nitro body with hydrogen using a nickel catalyst.

The reaction may be illustrated with the case of nitro benzoyl chloride and m-nitro-o-toluidine, which runs along the following equations:

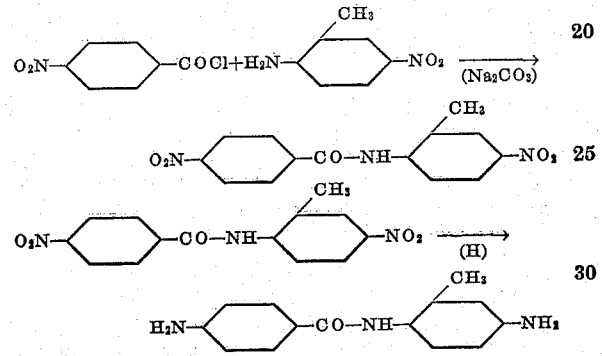

Without limiting our invention to any particular procedure the following examples are given to illustrate our preferred mode of operation. Parts mentioned are by weight.

*Example 1.—Synthesis of the dinitro compound*

152 parts of 5-nitro-2-amino-toluene and 50 parts of sodium acetate are added to 2000 parts of water with stirring, and heated to 60° C. About 279 parts (dry basis) of 4-nitro-benzoyl-chloride are then entered slowly in the form of a 20% solution in carbon-tetra-chloride, over a period of 2 to 3 hours, with good agitation. The temperature is maintained at about 57 to 63° C., and the mass is maintained alkaline to brilliant yellow paper throughout the course of addition, by the aid of soda-ash, if necessary.

Test samples are taken during the course of reaction to determine the presence or absence of free amine. When the test samples indicate completion of the condensation, the mass is heated to distil off the carbon-tetra-chloride. The residual mass is filtered hot and the filter cake is washed with hot water and dried. The product constitutes 4'-nitro-benzoylamino-2-methyl-4-nitrobenzene of the following formula:

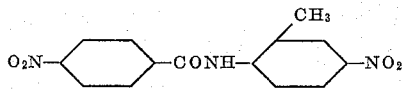

*Example 2.—Formation of the diamino compound*

235 parts of the dinitro product obtained above and 900 parts of methyl alcohol are placed in an autoclave together with 25 parts of a nickel catalyst and subjected to stirring. The autoclave is evacuated and the residual air is swept out by a stream of hydrogen. Hydrogen is then pumped in to a pressure of 500 lbs. per sq. in. and the mass is heated with continued agitation to 100–110° C. As the reaction continues additional hydrogen is pumped in to maintain within the vessel a pressure of 300–1000 lbs. per sq. in., and a temperature of 100–105° C., throughout the course of reaction. When hydrogenation has been completed, as indicated by the fact that the pressure no longer tends to drop, the charge is blown into a tank containing 1200 parts of water, 25 parts of a clarifying carbon (for instance "Darco"), and approximately 24 parts of hydrochloric acid (HCl basis). The mass is then heated to 75–80° C. and stirred for about 30 minutes. After filtering off the solid clarifying material, the filtrates are immediately made alkaline with an excess of ammonia (approximately 28 parts on NH4OH basis), filtered without delay, and the filter cake is washed until the washings no longer show alkalinity to brilliant yellow paper. When dried at 70° C. the filter cake yields a white crystalline product melting at 110–114° C., and constitutes most probably the compound p'-amino-benzoyl-p-tolylene-diamine of the formula

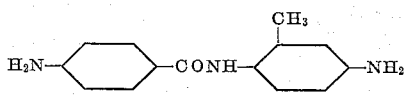

This compound forms a mono-hydrochloride which is quite soluble and a dihydrochloride which is less soluble in water.

*Example 3*

168 parts of 5-nitro-2-amino-anisole and 50 parts of sodium acetate are condensed in a manner analogous to Example 1, using the same quantities of materials, temperatures, etc. as in Example 1.

The condensation product after filtration, washing and drying, constitutes 4'-nitro-benzoyl-amino-2-methoxy-4-nitrobenzene of the following formula

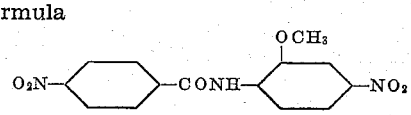

Upon catalytic reduction of the above compound in the same manner as in Example 2, except using 248 parts of the above dinitro compound in lieu of 235 parts of the dinitro compound of Example 1, 4'-amino-benzoylamino-2-methoxy-1,4-phenylene-diamine is obtained, corresponding to the following formula

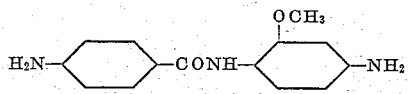

In a similar manner other compounds of the same general series may be obtained. The diamino compound ultimately derived from m-nitrobenzoyl-chloride and 5-nitro-2-amino-toluene possesses a melting point of about 167–168° C.

In the synthesis above, the nitrobenzoyl chloride may be replaced by any other nitroaryl halide, for instance the bromide or iodide, and the nitro group may be in position ortho, meta or para to the carbonyl group. Also, the phenyl radical of the nitro benzoyl-halide may carry nuclear substituents such as halogen, alkyl or alkoxy. Or again, a 1,4-nitronaphthoyl-halide may be employed in lieu of the nitrobenzoyl halide, resulting in a corresponding dinitro-naphthoyl derivative.

As for the nitro-phenyl amine component, the advantageous properties of the eventual dyestuff seem to be dependent on the choice of a para-nitro-amine. More particularly, we prefer to use in this invention a compound of the general formula

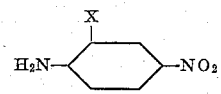

wherein X stands for alkyl or alkoxy, preferably ethyl, methyl, ethoxy, or methoxy.

It will be understood that our mode of procedure is not limited to the details set forth in the above examples, but may be varied widely within the experience of those skilled in this art. For instance, instead of suspending the nitro-aniline compound in water and adding to it the nitro-benzoyl compound in the form of a solution in an organic solvent, the procedure may be reversed, the nitro-aniline compound being dissolved in an organic solvent. Instead of carbon tetrachloride, any other suitable organic solvent may be employed, for instance, benzene or toluene. Instead of sodium acetate or soda ash in the condensation step any other customary acid absorbing agent for this type of synthesis may be employed, for instance potassium carbonate, potassium acetate, etc. Instead of catalytic reduction, with gaseous hydrogen, other standard procedures of reduction applicable to nitro compounds may be resorted to, for instance the reduction by the aid of sodium sulfide, iron and acid, sodium sulfhydrate, etc.

The desired dinitro products may also be prepared by dissolving the substituted nitroaniline in a solvent, such as toluene, and reacting the same with a nitro benzoic acid in the presence of phosphorus trichloride with or without the further presence of phosphorus oxychloride.

Many other variations and modifications will be apparent to those skilled in the art.

The products of the invention are utilized for the production of azo dyes of improved properties. These improvements comprise desirable changes in shade, and unexpected brightness of color as compared to dyes prepared from certain isomeric intermediates.

We claim:

1. A compound of the general formula

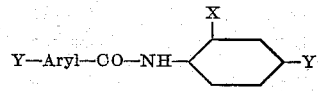

wherein "Aryl" stands for a bivalent arylene radical of the group consisting of radicals of the benzene and naphthalene series, X stands for a member of the group consisting of alkyl and alkoxy radicals, while Y designates a member of the group consisting of nitro and amino radicals.

2. A compound of the general formula

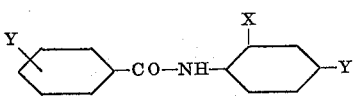

wherein X stands for a member of the group consisting of alkyl and alkoxy radicals while Y stands for a member of the group consisting of nitro and amino radicals.

3. A compound of the general formula

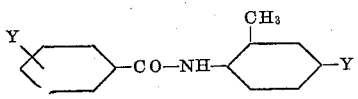

wherein Y stands for a member of the group consisting of nitro and amino radicals, said compound being adapted for use as an intermediate in the manufacture of azo dyestuffs.

4. A compound of the general formula

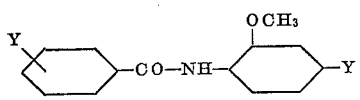

wherein Y stands for a member of the group consisting of nitro and amino radicals, said compound being adapted for use as an intermediate in the manufacture of azo dyestuffs.

5. A compound of the general formula

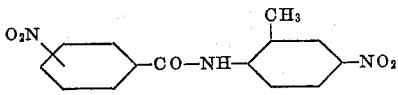

wherein the $O_2N$ group indicated on the left is located in position meta or para to the CO group.

6. A compound of the general formula

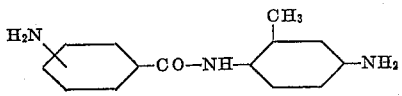

wherein the $H_2N$ group indicated on the left is located in position meta or para to the CO group.

7. A compound of the general formula

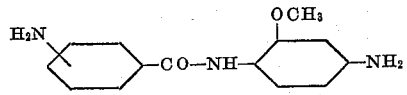

wherein the $H_2N$ group indicated on the left is located in position meta or para to the CO group.

8. The process of preparing an intermediate for dyestuffs, which comprises condensing a nitroaroyl halide of the general formula $$O_2N-Aryl-COZ,$$

where Aryl designates a bivalent radical of the group consisting of radicals of the benzene and naphthalene series while Z designates a halogen atom, with a p-nitro-aniline compound of the general formula

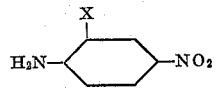

wherein X stands for a member of the group consisting of alkyl and alkoxy radicals.

9. The process of preparing an intermediate for dyestuffs, which comprises condensing a nitrobenzoyl halide with a nitroaniline compound of the general formula

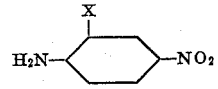

wherein X stands for a member of the group consisting of alkyl and alkoxy radicals, whereby to produce a nitrobenzoyl derivative of the nitroaniline compound.

10. A process as in claim 8 followed by the step of reduction whereby to produce a diamino compound.

11. A process as in claim 9 followed by the step of reduction whereby to produce a diamino compound.

SWANIE SIGUARD ROSSANDER.
HERMAN WISCHMAN MATHIEU.